United States Patent [19]

Fulford

[11] 4,415,053
[45] Nov. 15, 1983

[54] TRACTOR DRIVE MECHANISM

[75] Inventor: Dennis R. Fulford, Colchester, England

[73] Assignee: A. F. Trenchers Limited, England

[21] Appl. No.: 225,360

[22] Filed: Jan. 16, 1981

[30] Foreign Application Priority Data

Jan. 16, 1980 [GB] United Kingdom ............... 8001517

[51] Int. Cl.$^3$ ............................................. B60K 25/08
[52] U.S. Cl. ................................. 180/74; 180/53 CD
[58] Field of Search ............................ 180/74, 53 CD

[56] References Cited

U.S. PATENT DOCUMENTS

| 2,810,293 | 10/1957 | George et al. | 180/53 CD |
| 3,881,565 | 5/1975 | Parrish | 180/74 |
| 4,016,946 | 4/1977 | Demichelis | 180/74 |

FOREIGN PATENT DOCUMENTS

| 2711214 | 1/1979 | Fed. Rep. of Germany | 180/74 |
| 1545485 | 5/1979 | United Kingdom | 180/74 |

Primary Examiner—Joseph F. Peters, Jr.
Assistant Examiner—Donn McGehan
Attorney, Agent, or Firm—McGlew and Tuttle

[57] ABSTRACT

A drive mechanism for a tractor, to allow the tractor to be advanced at very slow speeds typically in the range of from 10 to 400 m/h. The mechanism may be mounted on a tractor or on an attachment for a tractor, such as a trenching machine, and rotatably supports a drive shaft which carries a pair of slatted drive wheels such that the wheels are adjacent the rear tires of the tractor. The mounting for the drive shaft is arranged to allow the drive wheels to be moved into and out of engagement with the tractor tires, and a power-drive mechanism is provided for the drive wheels to effect rotation thereof. The power drive mechanism may be adapted for connection to the tractor power-take-off, or could include a separate hydraulic motor. In operation, the drive wheels are urged into engagement with the tractor tires and on rotation of the drive wheels by the power-drive mechanism, the tractor wheels are turned, by virtue of the frictional engagement between the drive wheels and tractor tires and/or the intermeshing engagement between the drive wheel slats and the tire lugs.

16 Claims, 7 Drawing Figures

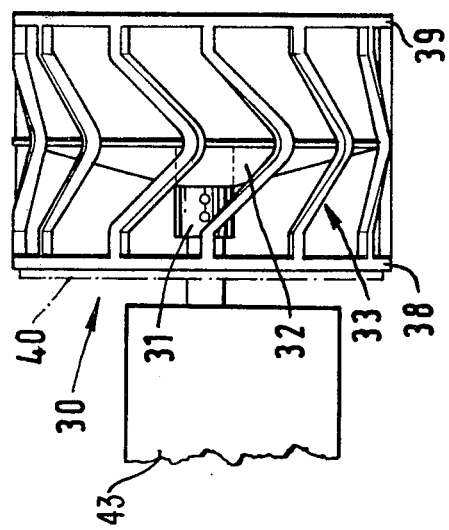
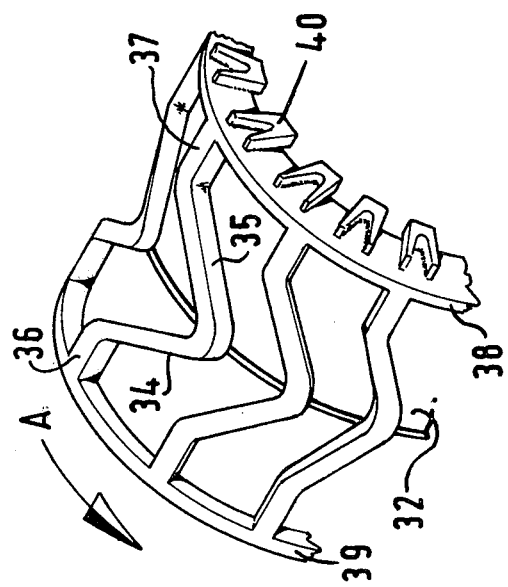

TRACTOR DRIVE MECHANISM

BACKGROUND OF THE INVENTION (a) Field of the Invention

This invention relates to a drive mechanism for a tractor, and in particular—but not exclusively—to a drive mechanism which when fitted to a tractor allows the tractor to be moved at relatively low speeds.

(b) Description of the Prior Art

Conventional agricultural tractors are at times fitted with machinery which is to moved at speeds slower than that continuously obtainable in the lowermost gear of the tractor: for instance trenching or other excavating machinery typically has to be advanced at speeds in the range of from 10 to 400 m/h, whereas the slowest continuous speed of the tractor when in bottom gear may be as fast as 2 km/h. To ensure proper operation of the machinery, the tractor has to be advanced step-wise, by frequently engaging the lowest gear and driving the tractor through a small distance.

In order to overcome the above-described problem, it is known to fit a tractor with a special gear-box, either to replace the standard gear-box or for insertion in the drive train from the standard gear-box to the driven axle, which special gear-box provides an extra reduction ratio, such as of 20:1 or even as much as 50:1. This solution is however very expensive to implement, and, for a contractor, may be most inconvenient for the trenching or other machinery cannot be transferred from one tractor to another, as required, but only between modified tractors. Moreover, the machinery probably will be used much less than the tractor, to which it may be fitted, so the service life of the machinery is longer than that of the tractor. These factors mean that several low speed special gear-boxes have to be purchased and fitted to several tractors to allow optimum use and life of one piece of machinery. It is a principal aim of this invention to provide a tractor drive mechanism which can be arranged to provide a relatively low drive speed, without the attendant disadvantages of using known low speed gear-box mechanisms, as just-described.

SUMMARY OF THE INVENTION

According to this invention, there is provided a drive mechanism for a tractor, which mechanism comprises a support frame adapted for mounting on a tractor, at least one drive wheel rotatably supported on said support frame so that said drive wheel is adjacent a rear wheel of the tractor when said frame is mounted on a tractor, operating means arranged to move said drive wheel to and from a drive position in which position said drive wheel drivingly engages the tire of said adjacent rear wheel of the tractor, and power drive means arranged to effect rotation of the drive wheel at least when the operating means has moved said drive wheel to said drive position.

In order that this invention may better be understood, it will now be described in greater detail and preferred aspects thereof given. Also one specific embodiment of the invention will be described by way of illustration thereof, by referring to the accompanying drawings.

BRIEF DESCRIPTION OF THE DRAWINGS

In the Drawings:

FIG. 3A is a perspective view of part of the periphery of an alternative form of drive wheel connected to a schematically shown trenching machine; and FIG. 3B is an end view on the alternative form of wheel shown in part in FIG. 3A.

DESCRIPTION OF THE PREFERRED EMBODIMENTS

Figures 1A, 1B:
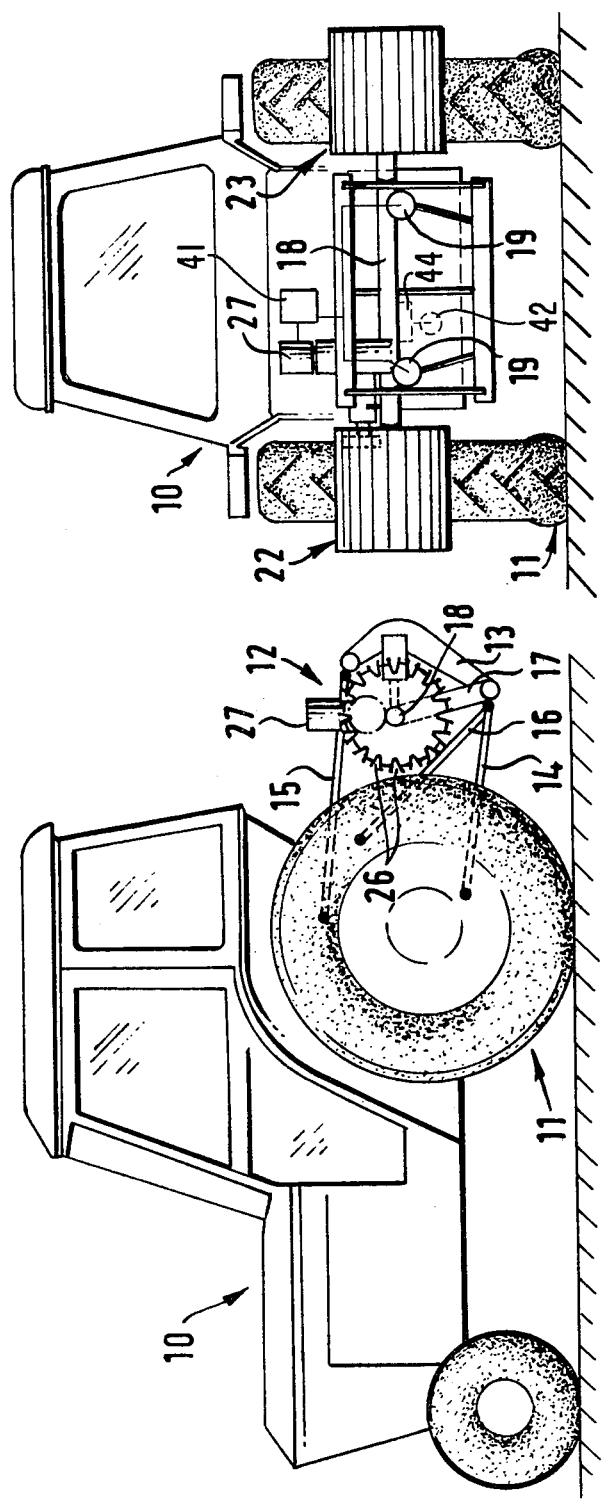
FIG. 1A is a diagrammatic side view of a tractor fitted with a drive mechanism according to this invention.
FIG. 1B is a rear view of the tractor of FIG. 1A.

It will be appreciated that the drive mechanism of this invention is in the form of an attachment for a tractor, and consequently no significant modification of the tractor is required when the mechanism is fitted. The support frame of the mechanism could be arranged for coupling directly to the draught links of a tractor, or may be adapted to pick up on some other mounting points on the tractor. Another possibility is for the mechanisms to be adapted for indirect mounting on the tractor; for example in the case where a trenching machine is mounted on the rear of the tractor, the frame of the drive mechanism may be adapted for mounting on the trenching machine rather than directly on the tractor, but still so that the drive wheel lies adjacent a rear wheel of the tractor. Thus, the drive mechanism of this invention allows a piece of low-speed machinery to be fitted to any one of a wide variety of tractors without the need expensively to modify those tractors.

The power drive means for the drive wheel preferably is arranged so as to be able to rotate the drive wheel at such a rate that the tractor will be moved, when the drive wheel is in its drive position, at a speed within the range of from 10 to 400 m/h. The power drive means could be arranged for connection to the tractor power-take-off 42 in FIG. 1B, and include a suitable gear-box 44 for driving the drive wheel at an appropriate rate, or the power drive means could instead have a motor for driving the drive wheel, through a gear-box if required. In the latter case, though the motor could be an independent internal combustion engine or an electric motor, it is preferred for a hydraulic motor to be used, which motor is supplied with hydraulic fluid under pressure from a hydraulic system driven by the tractor engine, via suitable controls. A hydraulic motor is most advantageous for such a motor can be constructed to exert high torques at relatively low rotational rates; an auxiliary gear-box between the motor and the drive wheel may then not be required, but if such a gear-box is needed to obtain a particular operating speed, the gear-box need have only a relatively small reduction ratio. A further advantage of using a hydraulic motor is that an infinitely variable drive speed can be obtained by using suitable controls for the motor.

The support frame or a part thereof carrying the drive wheel is preferably arranged for hinging movement when mounted on a tractor, whereby the drive wheel mounted thereon may be moved to and from its drive position. Conveniently, the operating means includes a hydraulic ram disposed to effect hinging movement of the support frame or part thereof, thereby to urge the drive wheel into firm driving engagement with the tire of the adjacent tractor rear wheel when drive is required. Instead of a ram, other mechanisms could be provided: for example, a cam mechanism associated with a trenching machine 43 in FIG. 3B, mounted on the tractor could automatically urge the drive wheel to its drive position whenever the trenching machine is lowered to its operating position, the drive wheel being disengaged automatically as the trenching machine is raised. Whatever technique be employed, it is found that optimum drive is obtained by causing the drive wheel locally to deform the tractor tire to a considerable extent—typically 75 mm to 100 mm.

It is preferred for the drive mechanism to have two drive wheels appropriately mounted on the support frame so as to be associated one with each tractor rear wheel respectively. Though each drive wheel could have an independent power drive means associated therewith, to allow a differential action, it is preferred for the two drive wheels to be rigidly mounted on a common drive shaft turned by the power drive means, sufficient differential action being obtained by slippage between the drive wheels and the tractor wheels and/or the tractor wheels and the ground.

The, or each drive wheel may take a variety of forms, provided that the drive wheel is capable of rotating the tractor rear wheel when engaged therewith. The drive itself could be achieved purely by friction between the drive wheel and the tractor tire, in which case the drive wheel may be a roller the axial length of which is similar to or greater than the tractor tire width. The roller could have a roughened surface, or be provided with apertures or perforations, to enhance the frictional drive and reduce the effect of any mud present. Alternatively, the drive could be achieved mostly frictionally, but enhanced by interengagement between the lugs on the tractor tire and suitable projections or recesses on or in the drive wheel. Thus, the drive wheel may be fabricated so as to have peripheral bars or slats which may extend parallel to the wheel axis or at some angle thereto. In this way, if great resistance to tractor movement is met, a lug on the tire could interengage with a bar or slat to give a toothed drive, until movement becomes easier and a frictional drive suffices again. On the other hand, the drive could be achieved essentially be intermeshing of bars or slats on the drive wheel with the ribs or lugs on a tractor tire, by disposing the bars or slats to correspond with the configuration of the ribs or lugs provided on the tractor tire. Thus, slats or bars in a herringbone pattern could be provided around the periphery of the or each drive wheel. Slats or bars also have the advantage of allowing displacement of any mud present, so that the mud will not interfere with the drive.

In a preferred embodiment of this invention, two spaced drive wheels are fixed on a drive shaft, each of which wheels has a slatted periphery both to enhance the frictional coupling thereof with a tractor tire, and to allow intermeshing with the ribs or lugs on the tire. In this embodiment, the slats themselves of one drive wheel define internal gear teeth for engagement with a toothed wheel mounted within that one drive wheel, the toothed wheel being driven by a hydraulic motor to effect rotation of the one drive wheel, and hence of the other drive wheel, via the drive shaft.

This invention extends to a tractor whenever fitted with a drive mechanism according to this invention, as described above.

The specific embodiment of this invention, incorporating many of the preferred aspects described above, will now be described. Referring to the drawings, there is shown a conventional tractor 10 having a pair of rear wheels 11 which normally are driven through a gearbox by the tractor engine. Mounted on the tractor chassis is the drive mechanism 12 of this invention, the mechanism being positioned adjacent but rearwardly of the rear wheels 11 and adapted when in use to effect rotation of the rear wheels.

The drive mechanism 12 comprises a support frame 13, which is connected to the tractor by the usual tractor draught links 14 and 15, an additional anti-torque link 16 being employed so that the frame is supported rigidly in the position shown. Pivotally mounted at the lower part of the frame 13 are a pair of spaced arms 17 which arms at their upper end support an axle tube 18 extending horizontally, generally parallel to the axis of the rear wheels 11. The axle tube 18 can be moved nearer to or farther from the rear wheels 11 by pivotal movement of the arms 17, actuated by a pair of double-acting hydraulic rams 19.

Rotatably supported by bearings 20 within the axle tube 18 is a drive shaft 21, which drive shaft has on each free end a drive wheel 22 and 23, respectively, rigidly connected thereto. The axial length of each drive wheel is greater than the width of a tractor gear wheel 11, and the length of the drive shaft is such that each drive wheel 22 and 23 is opposed to a tractor rear wheel 11. It will thus be appreciated that pivoting movement of the arms 17 will move the drive wheels 22 and 23 into and out of engagement with the tire of the rear wheels 11.

Each drive wheel comprises a hub 24 keyed on to the drive shaft 21, and a pair of discs 25. Welded to the periphery of the discs 25 are a plurality of slats 26, each slat extending parallel to the axis of the hub 24 and being of generally U-shaped cross-section with the base of the U-shape facing radially inwardly towards the hub 24.

Figure 2A:
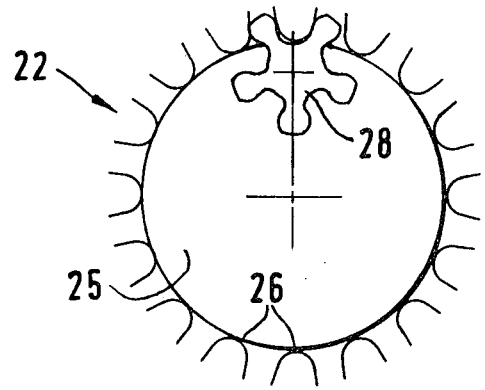
FIG. 2A is a diagrammatic view of the gear drive connection within the tractor drive mechanism.
Figure 2B:
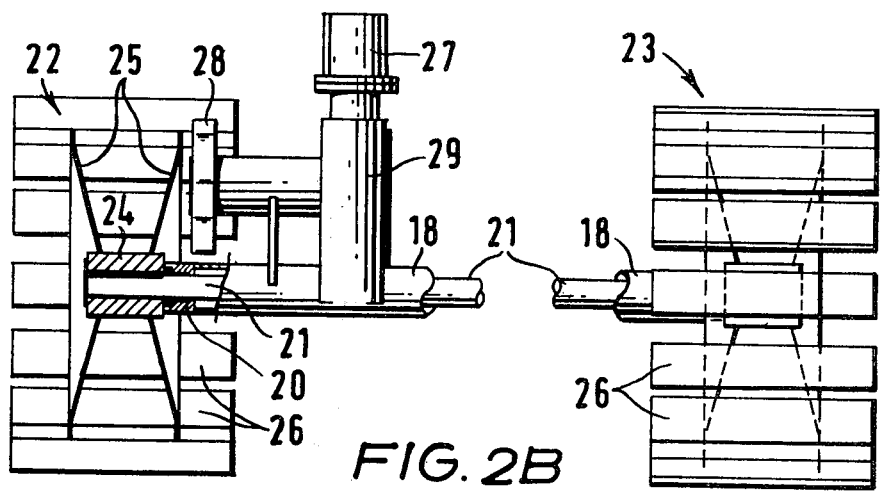
FIG. 2B is a partial rear view of the tractor drive mechanism, with various parts omitted for clarity.
Figure 2C:
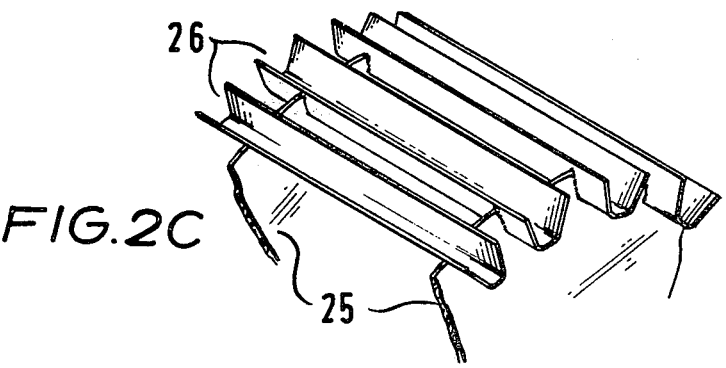
FIG. 2C is a perspective view of part of the periphery of a drive wheel of the drive mechanism.

Also mounted on the axle tube 18 is a hydraulic motor 27 driving a five-toothed wheel 28 through a worm reduction assembly 29, the axis of the toothed wheel 28 being parallel to the axis of the drive shaft 21. As can best be seen in FIGS. 2A and 2B, the disposition of the toothed wheel 28 and the shape of its teeth are such that the toothed wheel 28 is drivingly engaged with the slats 26 of the drive wheel 22. In this way, operation of the hydraulic motor 27 will rotate the toothed wheel 28 which in turn will drive the drive wheel 22; the drive wheel 23 is simultaneously rotated since both the drive wheels are firmly connected to the drive shaft 21.

In use, once the drive mechanism described above has been attached to a tractor by means of the links 14, 15 and 16 as shown in FIG. 1A, the hydraulic rams 19 are connected to the tractor hydraulic system, shown schematically at 41, through appropriate hoses and controls, as is the hydraulic motor 27. The hydraulic rams are contracted so that the drive wheels 22 and 23 are spaced from the tractor rear wheels, and the tractor then can be driven normally to the site where the tractor is to be moved very slowly. Then, the tractor gearbox is placed in neutral, the rams 19 are pressurised to urge the wheels 22 and 23 into engagement with the tractor rear wheels 11, and the hydraulic motor 27 is actuated slowly to turn the drive wheels 22 and 23: the frictional engagement between the slatted drive wheels 22 and 23 and the rear wheels 11 serves slowly to advance the tractor. In this way, very slow operating speeds can be obtained such as from 10 to 400 m/h, and typically 100 m/h.

FIGS. 3A and 3B show an alternative form of drive wheel, to replace the wheels 22 and 23 described above. This alternative drive wheel 30 comprises a hub 31 for keying to the drive shaft 21, the hub 31 having a dished disc 32 welded thereto which disc carries a plurality of slats 33 spaced around the periphery thereof. Each slat is formed from solid bar and has two inner portions 34 and 35 lying at an angle to one another and to the wheel axis, and two outer portions 36 and 37 extending parallel to the wheel axis in alignment with each other. The ends of the slats are interconnected by a pair of annuli 38 and 39 welded thereto, annulus 38 having a plurality of pre-formed driving teeth 40 welded thereto, for engagement by the toothed wheel 28 of the drive arrangement described above. Of course, only one drive wheel of a pair thereof need have such teeth 40.

In use, the drive wheel 30 is mounted on the drive shaft 21 for rotation in the sense of arrow 'A', on being driven by toothed wheel 28. The wheel 30 displays a better performance than the drive wheels 22 and 23 especially in adverse conditions: the solid bars of the slats cannot become clogged with mud and by having only one disc supporting the slats, no mud or other matter can become trapped within the wheel. Furthermore, the somewhat 'herringbone'-shaped slats give better driving characteristics with conventional tractor tires: if considerable resistance to movement of the tractor is encountered, the inner portions 34 and 35 of the slats may engage the upstanding tractor tire lugs along their long flanks and the outer portions 36 and 37 may at least partially engage the ends of the lugs, thereby imparting a driving torque to the whole tractor wheel. This arrangement thus gives better driving with less deformation of the tractor tire, and moreover is less prone to become clogged with mud or other spoil.

It will of course be appreciated that the drive mechanism could be mounted indirectly on the tractor. For instance, the tractor could be used to pull a vibrating mole plough or a trenching machine which plough or machine is coupled to the draught links 14 and 15 in the usual way but with the added anti-torque link 16. Then, the support frame 13 could be a part of the frame of the plough or machine or separately formed and attached to the frame of the plough or machine so as to be indirectly connected to the tractor.

What is claimed is:

1. A drive mechanism for a tractor, which mechanism comprises a support frame adapted for mounting on a tractor, at least one drive wheel rotatably supported on said support frame so that said drive wheel is adjacent a rear wheel of the tractor when said frame is mounted on a tractor, said drive wheel defining a ring of internally-directed teeth, operating means arranged to move said drive wheel to and from a drive position in which position said drive wheel drivingly engages a tire of the adjacent rear wheel of the tractor, and power drive means arranged to effect rotation of said drive wheel at least when said operating means has moved said drive wheel to said drive position, said power drive means including a power-driven toothed wheel which is meshed with said internally-directed teeth of said drive wheel.

2. A tractor drive mechanism as claimed in claim 1, in which said support frame is provided with means allowing the direct connection thereof to draught links of a tractor.

3. A tractor drive mechanism as claimed in claim 1, in which said power drive means for said drive wheel is arranged so as to be able to rotate the drive wheel at such a rate that a tractor carrying the mechanism will be moved, when said drive wheel is in its drive position, at a speed within the range of from 10 to 400 m/h.

4. A tractor drive mechanism as claimed in claim 1, in which said power drive means includes a hydraulic motor drivingly coupled to said drive wheel to effect rotation thereof.

5. A tractor drive mechanism as claimed in claim 1, in which said support frame has an arm hingedly connected thereto, said drive shaft being rotatably supported on said arm remote from the hinged connection thereof.

6. A tractor drive mechanism as claimed in claim 5, in which said operating means includes a hydraulic ram disposed to effect hinging movement of said arm thereby to urge said drive wheel into firm driving engagement with the tire of the adjacent rear wheel of a tractor when drive is required.

7. A tractor drive mechanism as claimed in claim 5, in which said operating means causes said arm to move said drive wheel into engagement with said adjacent rear wheel so as locally to deform the tractor tire radially inwardly by from 75 mm to 100 mm.

8. A tractor drive mechanism as claimed in claim 1, in which two said drive wheels are provided, mounted on said support frame and spaced apart so as to be associated one with each of two tractor rear wheels, respectively.

9. A tractor drive mechanism as claimed in claim 1, in which said drive wheel has a plurality of peripherally-spaced slots extending generally transversely parallel to the axis of said drive wheel.

10. A tractor drive mechanism as claimed in claim 1, in which said drive wheel has a plurality of peripherally-spaced slats each of which slats has two inner portions lying at an angle to one another and at an angle to the drive wheel axis, and each of which slats also has two outer portions which extend substantially parallel to the drive wheel axis in alignment with each other.

11. A tractor drive mechanism as claimed in claim 1, in which said power drive means is provided with a coupling adapted for connection to a power-take-off of the tractor, and includes a reduction gear-box for transferring the drive from said coupling to said drive wheel.

12. A tractor drive mechanism as claimed in claim 1, wherein said internally directed teeth are U-shaped and have bases extending inwardly.

13. A drive mechanism for a tractor, which mechanism comprises a support frame adapted for mounting on a tractor, an arm hingedly connected to the frame, at least one drive wheel rotatably supported on said arm remote from a pivotal connection of said arm to the frame so that said drive wheel is adjacent a rear wheel of the tractor when said frame is mounted on the tractor, said drive wheel defining a ring of internally directed teeth, operating means arranged to effect hinging movement of said arm thereby to move said drive wheel to and from a drive position in which drive position said drive wheel contacts and locally deforms radially inwardly by from 75 mm to 100 mm a tire of the adjacent rear wheel of the tractor thereby to allow drive to be imparted thereto, and power drive means including a power driven toothed wheel which meshes with the internally directed teeth of said drive wheel, which power drive means is thereby arranged to effect rotation of the drive wheel at least when the operating means has moved said drive wheel to said drive position.

14. A tractor drive mechanism as claimed in claim 13, in which two of said drive wheels are provided, mounted on arms provided on the support frame and spaced apart so as to be associated one with each of two tractor rear wheels, respectively.

15. A tractor drive mechanism as claimed in claim 13, in which each of said drive wheel has a plurality of peripherally-spaced slats each of which slats has two inner portions lying at an angle to one another and at an angle to a wheel axis, and each of which slats also has two outer portions which extend substantially parallel to the wheel axis in alignment with each other.

16. A tractor drive mechanism as claimed in claim 13, wherein said internally directed teeth each are U-shaped having bases extending inwardly of each said drive wheel.

* * * * *